United States Patent
Witte

[11] Patent Number: 5,904,346
[45] Date of Patent: May 18, 1999

[54] DEVICE FOR FINELY ADJUSTING STOP MEMBERS, LOCATING BOLTS, FITTING PIECES AND THE LIKE ON CHUCKING DEVICES, PARTICULARLY FOR MEASURING MACHINES AND MACHINE TOOLS

[75] Inventor: Andreas Witte, Bleckede, Germany

[73] Assignee: Horst Witte Entwicklungs- und Vertriebs-KG, Nahrendorf, Germany

[21] Appl. No.: 08/823,178

[22] Filed: Mar. 24, 1997

[30] Foreign Application Priority Data

Apr. 25, 1996 [DE] Germany ........................ 296 07 499 U

[51] Int. Cl.⁶ ...................................................... B23Q 1/04
[52] U.S. Cl. .................................. 269/71; 269/73; 269/82
[58] Field of Search ................... 269/71, 73, 45, 269/82–85

[56] References Cited

U.S. PATENT DOCUMENTS

| | | | |
|---|---|---|---|
| 2,521,231 | 9/1950 | Larson | 269/71 |
| 2,538,640 | 1/1951 | Click | 269/71 |
| 2,676,413 | 12/1954 | Wharton et al. | |
| 3,358,989 | 12/1967 | Zybak et al. | 269/71 |
| 4,253,649 | 3/1981 | Hewson | 269/82 |
| 4,500,077 | 2/1985 | Coxon | 269/82 |
| 4,934,671 | 6/1990 | Laninga et al. | 269/73 |
| 5,551,795 | 9/1996 | Engibarov | 269/73 |
| 5,716,043 | 2/1998 | Iwata et al. | 269/73 |

FOREIGN PATENT DOCUMENTS

| | | |
|---|---|---|
| 2703332 | 8/1978 | Germany . |
| 587448 | 4/1947 | United Kingdom . |

*Primary Examiner*—Robert C. Watson
*Attorney, Agent, or Firm*—Friedrich Kueffner

[57] ABSTRACT

A device for finely adjusting stop members, locating bolts, contoured fitting pieces or adapters and similar components on chucking devices, particularly for measuring machines and machine tools, includes a base member to be fastened to the chucking device and a tightening screw. A first guide member which is adjustable in the axial direction of the tightening screw is mounted on the base member. A second guide member mounted on the first guide member is adjustable transversely of the axial direction of the tightening screw. Mounted on the second guide member is an end member which is adjustable in the adjusting plane of the second guide member but transversely of the adjusting direction of the second guide member. The tightening screw extends through bores formed in the base member, the first and second guide members and the end member which are arranged one on top of the other.

8 Claims, 4 Drawing Sheets

DEVICE FOR FINELY ADJUSTING STOP MEMBERS, LOCATING BOLTS, FITTING PIECES AND THE LIKE ON CHUCKING DEVICES, PARTICULARLY FOR MEASURING MACHINES AND MACHINE TOOLS

BACKGROUND OF THE INVENTION

1. Field of the Invention

The present invention relates to a device for finely adjusting stop members, locating bolts, contoured fitting pieces or adapters and similar components on chucking devices, particularly for measuring machines and machine tools.

2. Description of the Related Art

In chucking devices of this type, a number of stop members, locating bolts and similar components are provided which, after a first coarse positioning, must be adjusted very accurately in all three axial directions. In the past, this has only been possible in an unsatisfactory manner. It is either necessary to adjust the entire chucking device or the individual stop member, or the respective locating bolt must be worked on or aligned individually in another manner.

SUMMARY OF THE INVENTION

Therefore, it is the primary object of the present invention to provide a device of the above-described type which makes possible a problem-free and particularly exact fine adjustment of the aforementioned stop members and the like in all three axial directions.

In accordance with the present invention, the fine adjustment device includes a base member to be fastened to the chucking device and a tightening screw. A first guide member which is adjustable in the axial direction of the tightening screw is mounted on the base member. A second guide member mounted on the first guide member is adjustable transversely of the axial direction of the tightening screw. Mounted on the second guide member is an end member which is adjustable in the adjusting plane of the second guide member but transversely of the adjusting direction of the second guide member. The tightening screw extends through bores formed in the base member, the first and second guide members and the end member which are arranged one on top of the other.

By arranging two guide members between the base member and the end member it is possible to adjust each member in an axial direction. The first guide member is adjusted in vertical direction, i.e., in the axial direction of the tightening screw. The second guide member is adjusted in a certain direction in a plane extending perpendicularly to the axial direction. The end member is adjustable also in this plane, but perpendicularly of the adjusting direction of the second guide member. Consequently, the end member is adjustable in all three directions, i.e., in the direction of the tightening screw and in any desired direction in the plane which extends perpendicularly of the tightening screw. For carrying out the adjustments, the tightening screw is released, the adjustment is carried out and the tightening screw is subsequently tightened again.

In accordance with an additional feature of the present invention, the adjustment of the first guide member in axial direction of the tightening screw is effected by means of a threaded ring which is screwed onto the tightening screw.

In accordance with another feature, instead of the threaded ring, a draw key is provided whose inclined surface rests on an adjacent inclined surface of the base member and which is adjustable perpendicularly of the axial direction of the tightening screw by a separate adjusting screw. In this embodiment, the inclined surfaces provide a larger contact area and, thus, the components are better secured against tilting and wiggling.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 2:
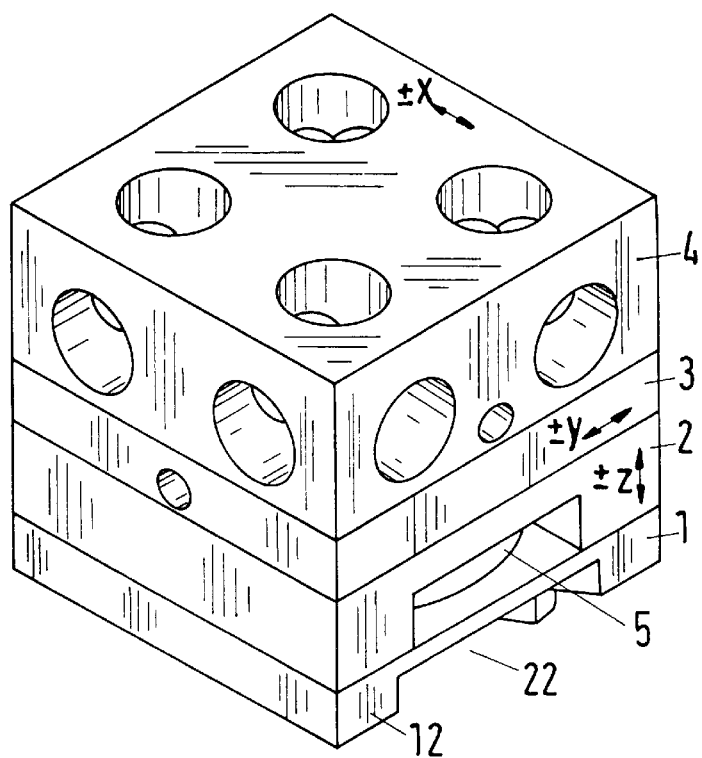
FIG. 2 is a perspective view of the device of FIG. 1 in the assembled state in the so-called "zero position"

The device according to the present invention is shown in all figures of the drawing in perspective views. The device is composed of four members, i.e. a base member 1, a first guide member 2, a second guide member 3 and an end member 4. The bodies 2, 3 and 4 are each adjustable in an axial direction. The first guide member 2 is adjustable in the Z-direction, the second guide member 3 is adjustable in the Y-direction and the end member 4 is adjustable in the X-direction. These directions are indicated in FIG. 2 by arrows.

A tightening screw 6 extends through all four bodies 1, 2, 3, and 4. The tightening screw 6 is loosened when a fine adjustment is to be carried out. The tightening screw 6 is received in a recess of the base member 1. The head 16 is provided with receiving openings for a tool, so that the screw 6 can be loosened and tightened. For this purpose, the base member 1 has a recess 22. The head 16 of the tightening screw 6 is accessible through the recess 22.

The tightening screw 6 extends through the two guide members 2 and 3 through a bore 23 each, wherein the diameter of the bore 23 is greater than the diameter of the tightening screw 6, so that movements of the two guide members 2 and 3 in the plane extending perpendicularly of the tightening screw 6 are possible. A thread 17 is provided in the end member 14 into which the tightening screw 6 can be screwed.

Figure 1:
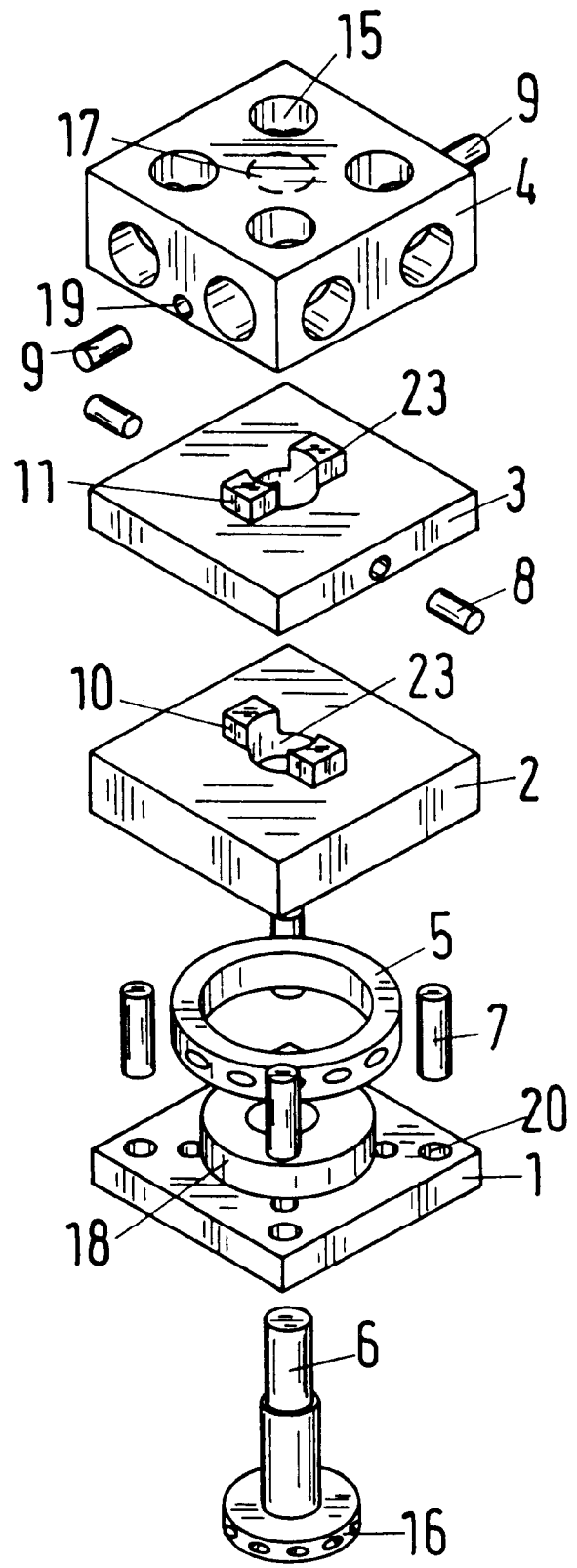
FIG. 1 is an exploded perspective view of an embodiment of the device according to the present invention.

In the embodiment illustrated in FIG. 1, a threaded ring 5 is arranged between the base member 1 and the first guide member 2. The threaded ring 5 is screwed onto a thread 18 of the base member 1 which is located centrally relative to the tightening screw 6 and the corresponding throughbore.

As is the case for the head 16, the threaded ring 5 is accessible from the outside, so that a tool can engage the threaded ring 5.

A tongue 10 is provided on the first guide member 2. The tongue 10 engages in a groove in the second guide member 3. Provided perpendicularly of the tongue 10 on the second guide member 3 is a tongue 11 which engages in a groove 14 of the end member 4. As a result, the second guide member 3 can be moved in one direction in the plane extending perpendicularly of the tightening screw 6 and the end member 4 is movable in this plane perpendicularly of the second guide member 3.

In order to carry out these movements in the plane extending perpendicularly of the tightening screw 6, two adjusting screws 8 and 9 are provided for each tongue and groove connection. By turning these adjusting screws which make contact with the corresponding tongue, this tongue and, consequently, either the second guide member 3 or the end member 4 are adjusted in the desired direction in the plane extending perpendicularly of the tightening screw 6. The adjusting screws 8 and 9 are received in threaded bores 19 in the corresponding member and are adjustable from outside.

The base member 1 is fastened to the chucking device by means of projections 12 or the like.

Guide pins 7 are arranged in appropriate guide bores between the base member 1 and the first guide member 2. These guide pins permit a vertical movement of the first guide member 2 in axial direction of the tightening screw 6 when the threaded ring 5 is turned.

Figure 3:
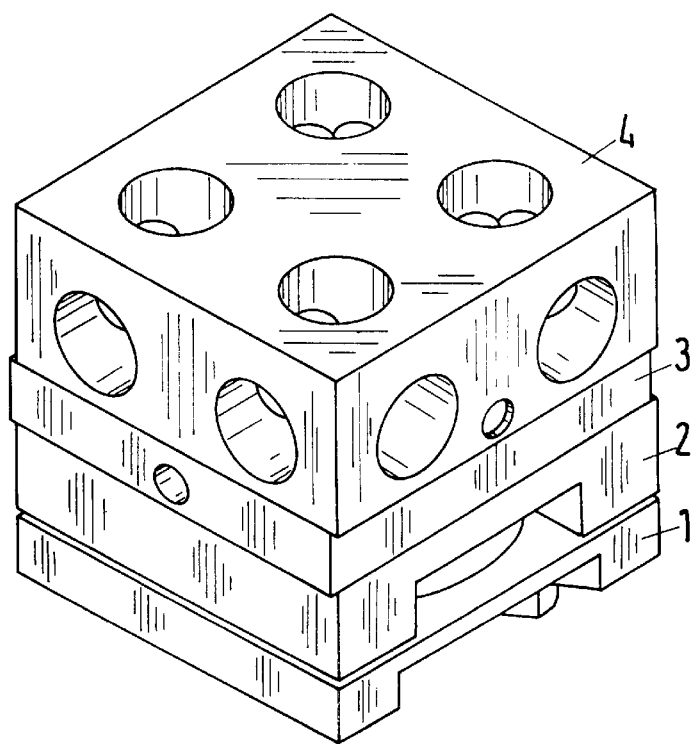
FIG. 3 is the same view as FIG. 2, except that the components are adjusted in all three axial directions.
Figure 4:
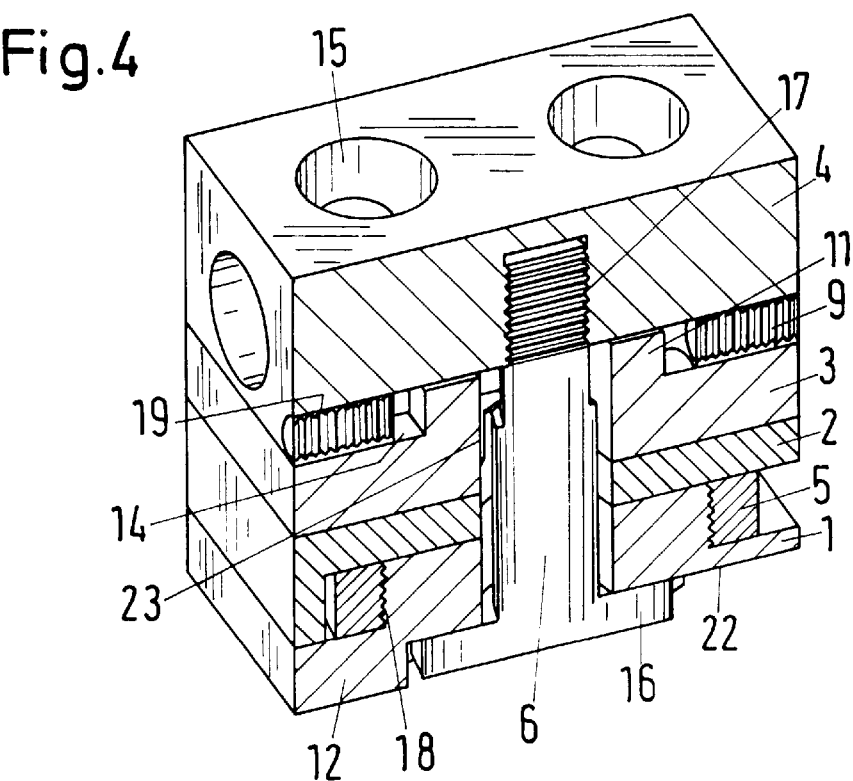
FIG. 4 is a sectional view of the device of FIG. 2 as seen from above.
Figure 5:
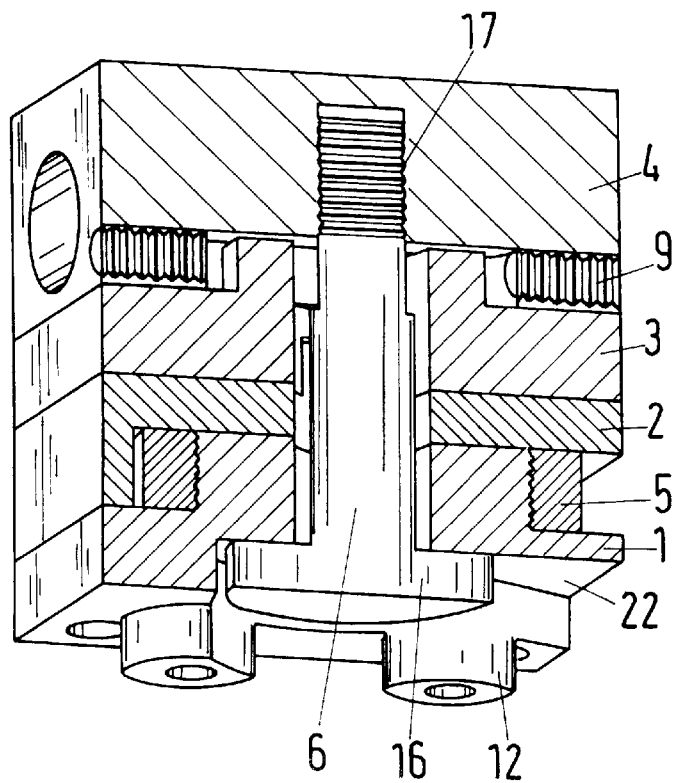
FIG. 5 is sectional view corresponding to FIG. 4, but seen from below.

If a fine adjustment is to be carried out, for example, from the position shown in FIG. 2 into the position shown in FIG. 3, initially the tightening screw 6 is loosened by an appropriate tool. Subsequently, the threaded ring 5 is turned counter-clockwise until the first guide member 2 has been raised to the desired extent. The adjusting screws 8 are then turned in order to influence the tongue 10 and to displace the guide member 3 in the desired direction in the plane extending perpendicularly of the axis of the tightening screw 6. In the same manner, the end member 4 is displaced by means of the adjusting screws 9. When the end body 4 and the stop member, or another component fastened thereto, has reached the desired position, the tightening screw 6 is tightened.

It is readily apparent that the end member 4 and, thus, the piece fastened thereto, can be adjusted very precisely into each desired position to a certain extent. An exact movement in all three axial direction Z, X and Y is possible.

Of course, individual guide means can be constructed differently. Instead of the tongue and groove connections, other mechanical means can be selected in order to ensure the movement in the appropriate plane and in the desired direction.

Figure 6:
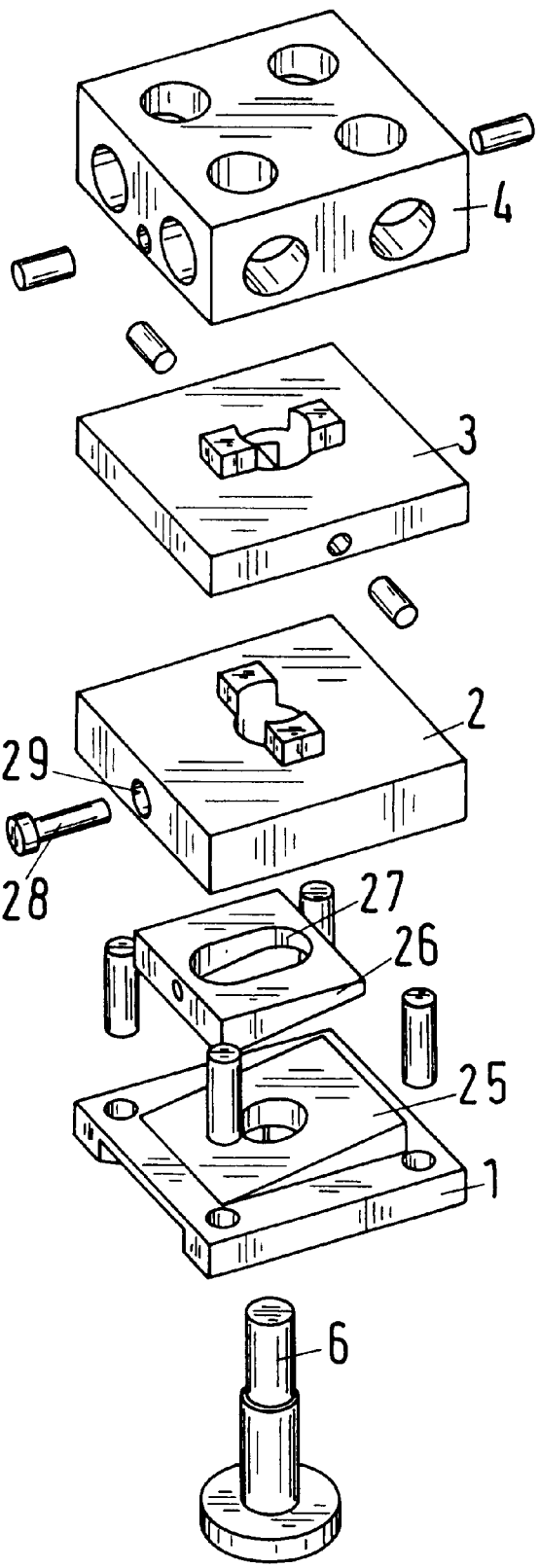
FIG. 6 is an exploded perspective view of another embodiment of the device according to the present invention.

FIG. 6 of the drawing shows another embodiment in which for the movement in the Z-axis, a draw key 26 is provided instead of the threaded ring 5 between the first guide member 2 and the base member 1. The base member 1 has a corresponding inclined surface 25. An oblong hole 27 is provided in the draw key 26, wherein the tightening screw 6 extends through the oblong hole 27. The draw key 26 is movable back and forth in the direction of the oblong hole 27 by means of an adjusting screw 28 which is screwed into a thread 29 in the first guide member 2.

In the embodiment of FIG. 6, a larger contact area is made available, so that tilting and wiggling are prevented. For carrying out the adjustment in the Z-direction, i.e., in the axial direction of the tightening screw 6, the adjusting screw 28 is turned and the draw key 26 is displaced as a result. Because of the configuration as an oblong hole 27, this movement is not impaired by the tightening screw 6. The remaining components of the embodiment of FIG. 6 correspond to those of FIG. 1.

While specific embodiments of the invention have been shown and described in detail to illustrate the inventive principles, it will be understood that the invention may be embodied otherwise without departing from such principles.

I claim:

1. A device for finely adjusting stop members, locating bolts, contoured fitting pieces or adapters and similar components on chucking devices, particularly for measuring machines and machine tools, the device comprising a base member adapted to be fastened to a chucking device, a tightening screw having an axial direction, a first guide member mounted on the base member so as to be adjustable in the axial direction of the tightening screw, a second guide member mounted on the first guide member so as to be adjustable in an adjusting plane transversely of the axial direction of the tightening screw, further comprising an end member mounted on the second guide member so as to be adjustable in the adjusting plane of the second guide member but transversely of the adjusting direction of the second guide member, first guide means between the first guide member and the second guide member and second guide means between the second guide member and the end member, wherein the first guide means extend perpendicularly of the second guide means, wherein the base member, the first and second guide members and the end member each have a bore, and wherein the tightening screw extends through the bores of the base member, the first and second guide members and the end member.

2. The device according to claim 1, wherein the tightening screw comprises a head, a thread and a diameter, wherein the bores in the first and second guide members each have a diameter which is greater than the diameter of the tightening screw such that the first and second guide members are movable in the plane extending perpendicularly of the axial direction of the tightening screw, the end member further comprising a threaded bore for receiving the thread of the tightening screw.

3. The device according to claim 1, further comprising a threaded ring mounted between the base member and the first guide member, the base member having a thread arranged concentrically relative to the tightening screw, wherein the threaded ring is screwed onto the thread of the base member for effecting the adjustment of the first guide member in the axial direction of the tightening screw.

4. The device according to claim 3, wherein the base member and the first guide member comprise guide bores, further comprising guide pins received in the guide bores and extending between the base member and the first guide member parallel to the tightening screw.

5. The device according to claim 1, further comprising a draw key with an inclined surface mounted between the base member and the first guide member, the base member having an inclined surface contacting the inclined surface of the draw key, further comprising an adjusting screw for adjusting the draw key in a direction extending perpendicularly of the axial direction of the tightening screw so as to adjust the first guide member in the axial direction of the tightening screw.

6. The device according to claim 5, wherein the base member and the first guide member comprise guide bores, further comprising guide pins received in the guide bores and extending between the base member and the first guide member parallel to the tightening screw.

7. The device according to claim 1, wherein the first and second guide means are tongue and groove guide means.

8. The device according to claim 7, further comprising additional adjusting screws for finely adjusting each tongue and groove guide means.

* * * * *